US008305367B2

(12) United States Patent
Shen

(10) Patent No.: US 8,305,367 B2
(45) Date of Patent: Nov. 6, 2012

(54) METHOD FOR DRIVING DISPLAY DEVICE TO HIDE TRANSIENT BEHAVIOR

(75) Inventor: Yuh-Ren Shen, Hsinchu (TW)

(73) Assignee: Vastview Technology Inc., Hsinchu (TW)

( * ) Notice: Subject to any disclaimer, the term of this patent is extended or adjusted under 35 U.S.C. 154(b) by 715 days.

(21) Appl. No.: 12/496,759

(22) Filed: Jul. 2, 2009

(65) Prior Publication Data

US 2009/0267972 A1 Oct. 29, 2009

Related U.S. Application Data

(62) Division of application No. 11/437,743, filed on May 22, 2006, now abandoned.

(51) Int. Cl.
*G06F 3/038* (2006.01)

(52) U.S. Cl. .......... 345/204; 345/102; 345/89; 345/690

(58) Field of Classification Search .................... 345/38, 345/50-54, 60, 87-104; 348/751, 761
See application file for complete search history.

(56) References Cited

U.S. PATENT DOCUMENTS

| | | | | |
|---|---|---|---|---|
| 6,693,619 | B1 * | 2/2004 | Miura et al. | 345/102 |
| 7,773,065 | B2 * | 8/2010 | Kumamoto | 345/87 |
| 2002/0047821 | A1 * | 4/2002 | Miyake | 345/87 |
| 2003/0095088 | A1 * | 5/2003 | Ham | 345/87 |
| 2004/0017342 | A1 * | 1/2004 | Sekine | 345/87 |
| 2004/0196229 | A1 * | 10/2004 | Ham | 345/87 |
| 2005/0237292 | A1 * | 10/2005 | Kim et al. | 345/102 |
| 2005/0275611 | A1 * | 12/2005 | Aoki | 345/96 |
| 2006/0017677 | A1 * | 1/2006 | Ohmuro et al. | 345/87 |
| 2006/0139289 | A1 * | 6/2006 | Yoshida et al. | 345/98 |
| 2006/0152462 | A1 * | 7/2006 | Furihata et al. | 345/98 |
| 2006/0176255 | A1 * | 8/2006 | Do et al. | 345/87 |

* cited by examiner

*Primary Examiner* — Amare Mengistu
*Assistant Examiner* — Vinh Lam
(74) *Attorney, Agent, or Firm* — Birch, Stewart, Kolasch & Birch, LLP

(57) ABSTRACT

The major characteristics of the present invention lies in that, on one hand, conventional driving or overdriving techniques that do not add significant cost to the display device are used for scanning while, on the other hand, the direct-lit, LED-based backlight is turned off during the pixels' transient period where their grey levels gradually approach or overshoot above the target grey levels so that the residuals of the dynamic images during the transient period are not manifested.

3 Claims, 7 Drawing Sheets

METHOD FOR DRIVING DISPLAY DEVICE TO HIDE TRANSIENT BEHAVIOR

This application is a Divisional of application Ser. No. 11/437,743 filed on May 22, 2006 now abandoned, for which priority is claimed under 35 U.S.C. §120, the entire contents of which are hereby incorporated by reference into the present application.

BACKGROUND OF THE INVENTION

1. Field of the Invention

The present invention generally relates to display devices, and more particularly to a method for driving a display device having LED-based direct-lit backlight module.

2. The Prior Arts

Liquid crystal has already become the mainstream technology for display devices. It is well known that liquid crystal display (LCD) devices are hold-type display devices due to the retardation property of the liquid crystal molecules. Compared to the impulse-type display devices such as cathode ray tube (CRT) devices, the dynamic response (i.e., the display quality of dynamic images) of the LCD devices has been notoriously inferior. This defect of LCD devices therefore has been the major research and development focuses both throughout academic and industrial arenas.

FIG. 1*a* is a schematic structural diagram showing a conventional LCD device. As illustrated, cold cathode fluorescent lamp (CCFL) tubes are used as light source for a direct-lit backlight module (denoted as CCFL backlight) and the lighting of the CCFL tubes is controlled by a control circuit. The backlight module usually further contains a diffuser disposed between the backlight module and the display panel to process the light of the CCFL tubes into uniform planar light. The display panel has a number of vertical data lines D1, D2, . . . , Dm (only D1 is shown) and a number of horizontal scan lines G1, G2, . . . , Gn (only G1 is shown). The intersection of each scan line and each data line defines a pixel of the display panel (e.g., the pixel P1 at the intersection of the scan line G1 and the data line D1). Each data line is driven by a data driver and each scan line is enabled by a gate driver. The data and gate drivers are in turn controlled by a control board of the LCD device. Usually, the control board contains a timing controller, a Gamma correction circuit, a power circuit, etc.

The illumination of the pixel P1 is achieved by enabling the scan line G1 by a gate driver and, then, applying a driving voltage onto the data line D1 by a data driver. Due to the retardation property of liquid crystal molecules, the grey level of the pixel P1 under the driving voltage does not reach instantly, but gradually approach, a target level corresponding to the driving voltage. Because of such retardation property (or, low response speed), fast-moving dynamic images on LCD devices suffers residuals, blurring, and flickering. To overcome these problems, a number of methods for speeding up the response of LCD devices are disclosed. FIG. 1*b* is a waveform diagram showing the timing relationship of various control signals of the LCD device of FIG. 1*a*. In the diagram, it is assumed that column inversion is used by the LCD device to alter the orientation of the liquid crystal molecules (for people skilled in the related arts, column inversion and other similar methods should be quite familiar to them). In addition, the waveform denoted as Vsync is the vertical synchronization signal of the LCD device, the waveforms G1~Gn are the enable signals to the scan lines whose pulse width is determined by the horizontal synchronization signal Hsync of the LCD device, the waveform D1 is the driving voltage signal applied to the data line D1, the waveform Vlc is the voltage variation of the pixel P1, the waveform BL is the control signal to the backlight module, and the waveform P1 is the brightness (i.e., grey level) variation of the pixel P1.

As shown in FIG. 1*b*, assuming that the pixel P1 has a target voltage code16 in frame N-1 and a target voltage code200 in frame N (please note that different target voltages imply different target grey levels), the variation of the pixel P1's grey level in frame N would follow the curve denoted as original and approach the target grey level gradually, if no speed-up method is adopted (i.e., the pixel P1 is directly applied with the target voltage in frame N). A conventional speed-up method is to apply a larger overdriving voltage code220 to the pixel P1. The variation of the pixel P1's grey level in frame N therefore would follow the curve denoted as overdriving and approach the target grey level faster. Another conventional speed-up method is to apply a larger overdriving voltage code230 in the first half period of frame N and then the target voltage code200 in the second half period to the pixel P1. In order to apply two different voltages to within a single frame time, this conventional method doubles the frame rate from 60 Hz to 120 Hz and the method is therefore referred to as a double frame rate (DFR) overdriving method. The variation of the pixel P1's grey level in frame N therefore would follow the curve denoted as DFR overdriving and approach the target grey level even faster. Please note that, for the foregoing approaches, the CCFL backlight is always turned on as can be seen from the waveform BL.

The foregoing approaches are indeed effective in speeding up the LCD device. However, as can be seen from FIG. 1*b*, the behavior of the liquid crystal molecules in approaching their target grey levels, due to their inherent limitation, can only be improved and cannot be completely eliminated. On the other hand, the spent effort inevitably would cause the increase of cost and better improvement implies higher cost. In practice, under economical concerns, these approaches might not be acceptable.

As the CCFLs suffer potential environmental issues from the mercury vapor contained in the lamp tubes, while light emitting diodes (LEDs) have been advanced to provide superior switching speed, lighting efficiency, and cost, LEDs have become the preferred light source for direct-lit backlight module. On the other hand, the development of the backlight modules was mainly focused on how to enhance the uniformity and brightness of the light provided by the backlight module. But recently, as the LED-based, direct lit solution has become the mainstream technology for backlight modules, there are interests in utilizing the fast switching speed of the backlight LEDs to improve the LCD device's dynamic response.

SUMMARY OF THE INVENTION

Therefore, a method is provided by the present invention which integrates the scanning of a display device and the control of the display device's direct-lit, LED-based backlight module so as to resolve the blurring and flickering problems resulted from the slow response speed of hold-type display devices.

The major characteristics of the present invention lies in that, on one hand, conventional driving or overdriving techniques that do not add significant cost to the display device are used for scanning while, on the other hand, the direct-lit, LED-based backlight modules are turned on and off appropriately and synchronously so as to economically avoid the impacts to the quality of dynamic images from the pixels' transient behavior in gradually approaching their target grey levels.

Three conventional scanning techniques are adopted by the present invention which include the ordinary overdriving, the DFR overdriving, and an excessive overdriving techniques. When one of the three techniques is used to scan the display device, in the mean time, the present invention turns off the backlight during the pixels' transient period where their grey levels gradually approach or overshoot above the target grey levels so that the residuals of the dynamic images during the transient period are not manifested. Please note that the subject matter of the present invention does not lie in the overdriving techniques, but a novel integration of the conventional overdriving techniques with the control of the direct-lit, LED-based backlight modules so as to achieve unprecedented results.

The present invention can further turn on and off the backlight module in a frequency twice of the frame rate to resolve the flickering problem of the hold-type display device. The present invention can be applied to, in addition to LCD devices, plasma display devices, organic light emitting display (OLED) devices, or other similar display devices.

The foregoing and other objects, features, aspects and advantages of the present invention will become better understood from a careful reading of a detailed description provided herein below with appropriate reference to the accompanying drawings.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1A:
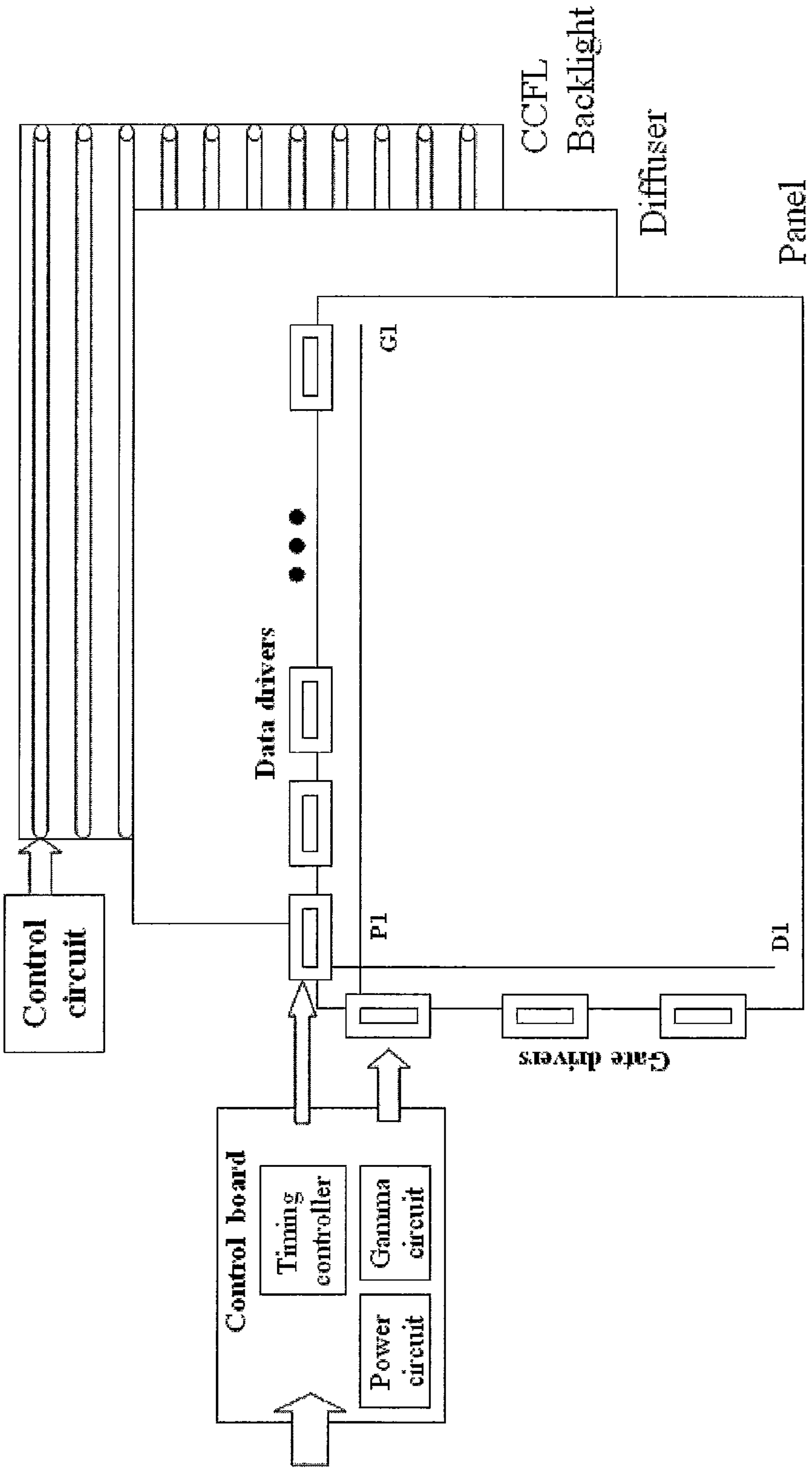
FIG. 1a (Prior Art)
FIG. 1*a* is a schematic structural diagram showing a conventional LCD device.
Figure 2:
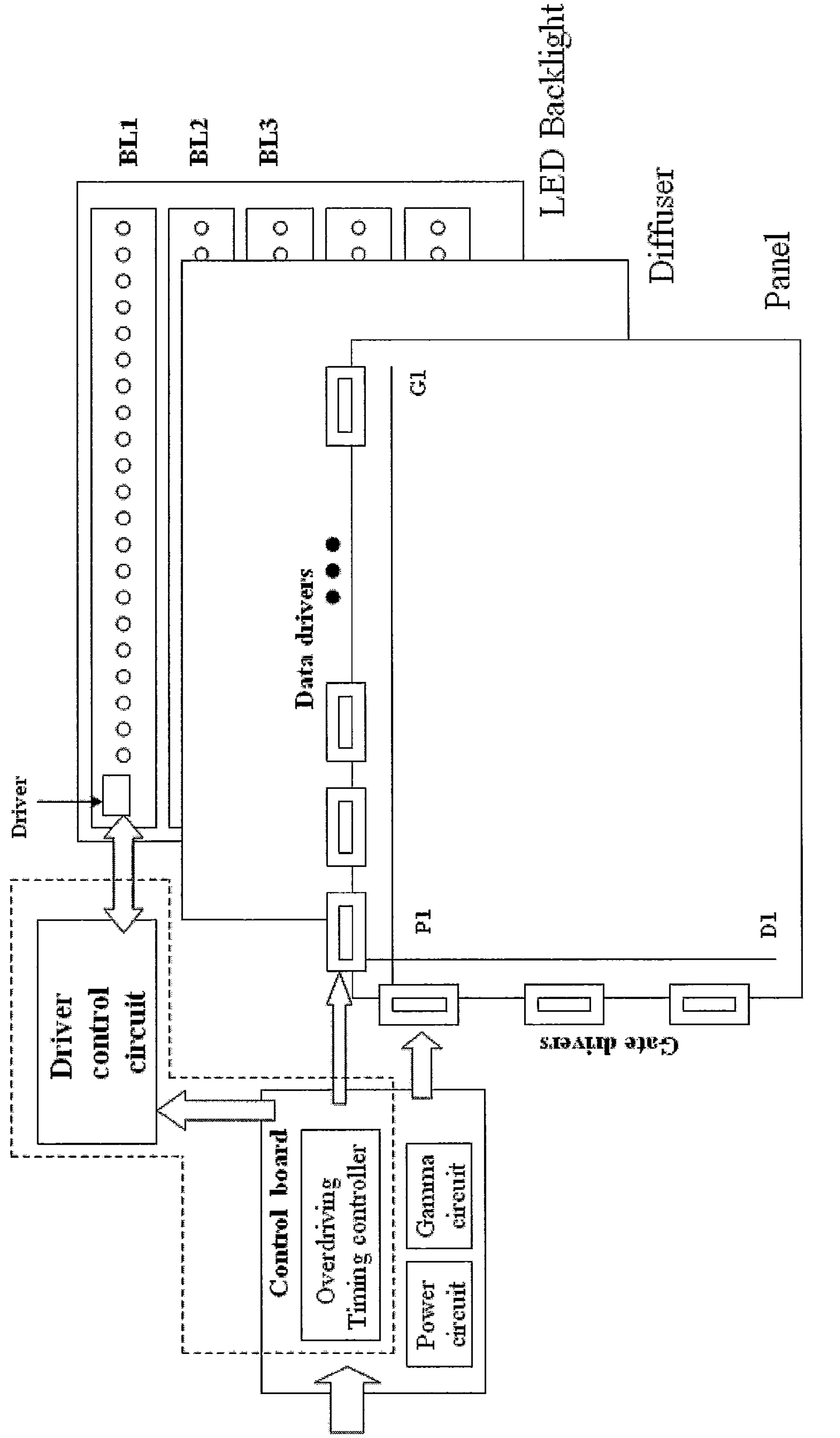
FIG. 2 is a schematic structural diagram showing a LCD device where the present invention is implemented.

FIG. 2 is a schematic structural diagram showing a LCD device where the present invention is implemented. Please note that the present invention can also be applied to plasma display devices and OLED devices. In the following, for simplicity, the LCD device is mainly used as an example to explain the spirit and principles of the present invention. For the embodiments described as follows, it is assumed that column inversion is used for altering the orientation of liquid crystal molecules in the LCD device but it should be noted that the present invention is not limited to column inversion only. As illustrated in FIG. 2, the LCD device appropriate for the present invention has a direct-lit backlight module using multiple LEDs as light source (denoted as LED backlight in the diagram). The LEDs are arranged into a number of parallel rows (denoted as BL1, BL2, BL3, etc. in the diagram) and each row of LEDs is driven by a driver. The drivers are in turn controlled by a driver control circuit. The LCD device is basically identical to the one shown in FIG. 1*a*, except that the present invention integrates the conventional overdriving techniques and therefore the timing controller of FIG. 1*a* is denoted as overdriving timing controller in FIG. 2. Please also note that, in FIG. 2, the overdriving timing controller and the driver control circuit are shown to be two separate devices. In some embodiments, the two devices can also be combined together as a single device as shown by the dashed box. It has to be stressed again that the structure shown in FIG. 2 is only exemplary; and, as the subject matter of the present invention relies on the simultaneous and synchronized control of the rows of LEDs in the backlight module and the scanning of the LCD panel, any structure having such capability is applicable to the present invention.

Figure 1B:
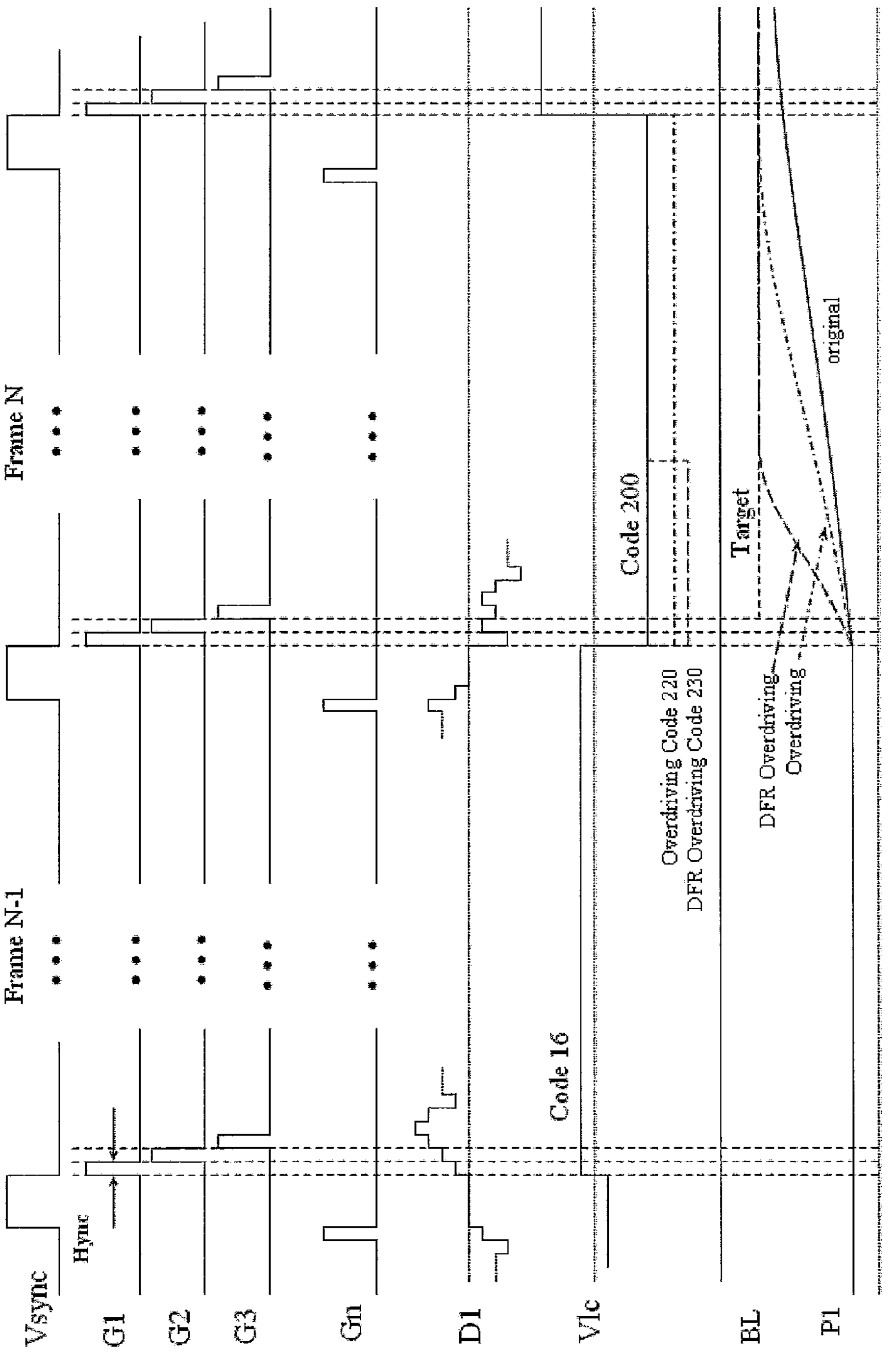
FIG. 1b (Prior Art)
FIG. 1*b* is a waveform diagram showing the timing relationship of various control signals of the LCD device of FIG. 1*a*.
Figure 3:
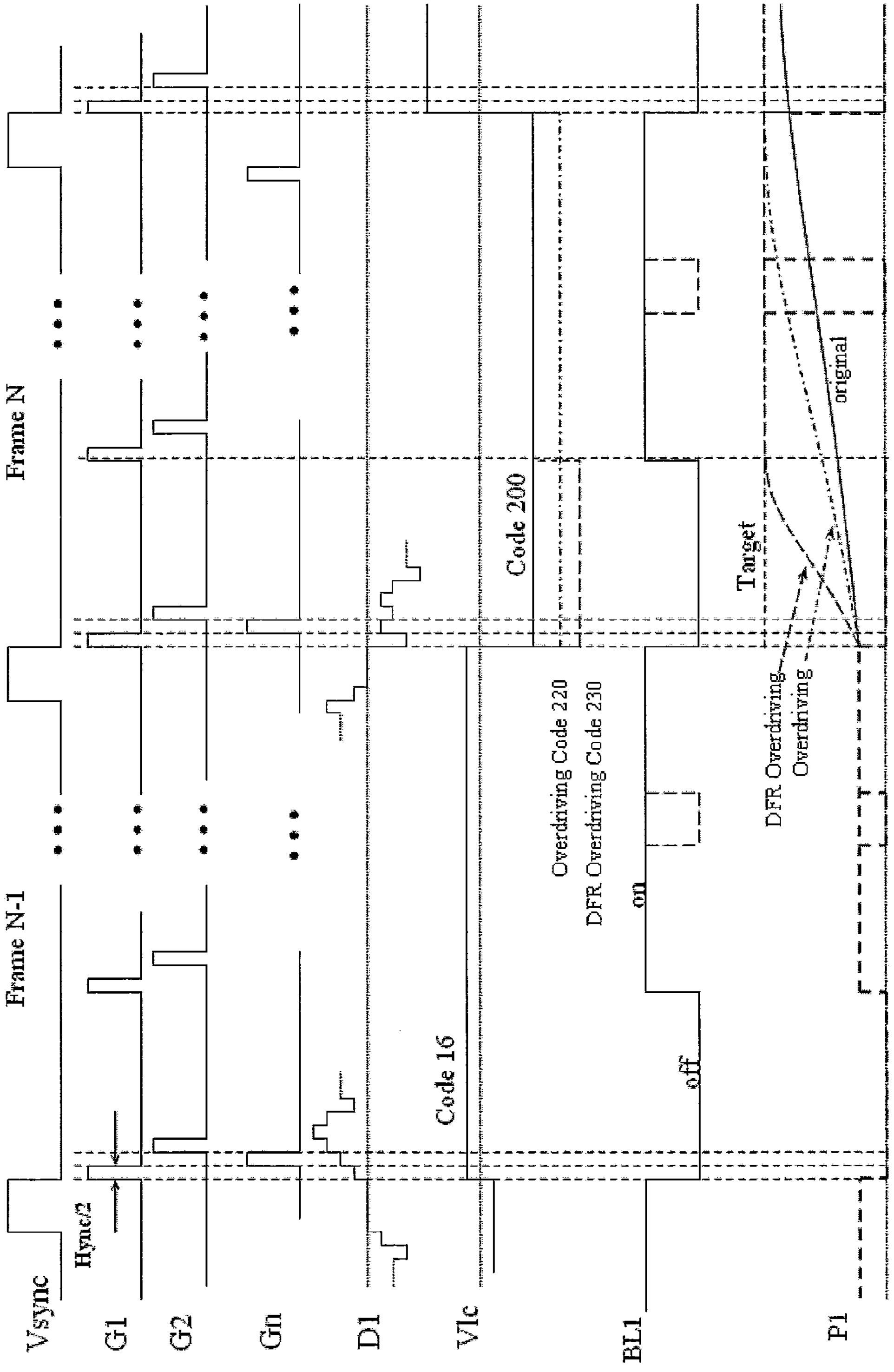
FIG. 3 is a waveform diagram showing the timing relationship of various control signals according to a first embodiment of the present invention.

FIG. 3 is a waveform diagram showing the timing relationship of various control signals according to a first embodiment of the present invention. In the following, the explanation of the present invention is mainly based on the control signal applied to the first row of LEDs (i.e., BL1). The rest of the control signals are very similar to those of FIG. 1*b*, which are included here mainly for comparison. In this embodiment, again, it is assumed that the target voltages of the pixel P1 are code 16 and code200 in frame N-1 and frame N respectively. The present embodiment use the DFR overdriving technique to scan the LCD panel (therefore, the pulse width of the enable signals to the scan lines G1~Gn is Hsync/2). As such, the present embodiment applies an overdriving voltage code230 to the pixel P1 in the first half of the period of frame N and then a driving voltage code200 identical to the target voltage in the second half of the period. In the mean time, the present embodiment applies a control signal whose frequency is identical to the frame rate to the first row of LEDs (i.e., BL1) to turn the LEDs off and on. In accordance with the top-down scanning of the scan lines, the control signals to the rows of LEDs BL2, BL2, etc. are provided so that their times to turn on their corresponding row of LEDs are sequentially delayed (in the subsequent description of other embodiments, the waveform BL2 will be provided for comparison).

It can be seen from the period of frame N-1 that the brightness (i.e., grey level) of the pixel P1 decreases to the minimum when its backlight is turned off (i.e., when BL1 is off). As such, by controlling the BL1 control signal so that BL1 is turned on after the pixel P1 has reached its target grey level, the residuals of the dynamic images during the transient period of the pixel P1 are not visible as the backlight is turned off. In an alternative embodiment of the present invention, the ordinary overdriving technique is used to scan the LCD panel (therefore, the pulse width of the enable signals to the scan lines G1~Gn is Hsync). As such, the present embodiment applies an overdriving voltage code220 to the pixel P1. Based on the foregoing principle, most of the transient period of the pixel P1 is not visible. However, as the overdriving voltage is not large enough, some part of the transient period is still visible as the pixel P1 fails to reach its target grey level after the backlight is turned on. In other words, for ordinary overdriving techniques, the present invention is not perfect but still can effectively eliminate a large portion of the residuals. As the present embodiment does not require the more costly DFR scanning, it is more advantageous to the previous embodiment. For the foregoing two embodiments, the present invention can also apply control signals to the rows of LEDs with a frequency twice of the LCD device's frame rate (please note the dashed line of the control signal BL1). The advantage of this approach is that the flickers of the displayed images can be avoided.

Figure 4A:
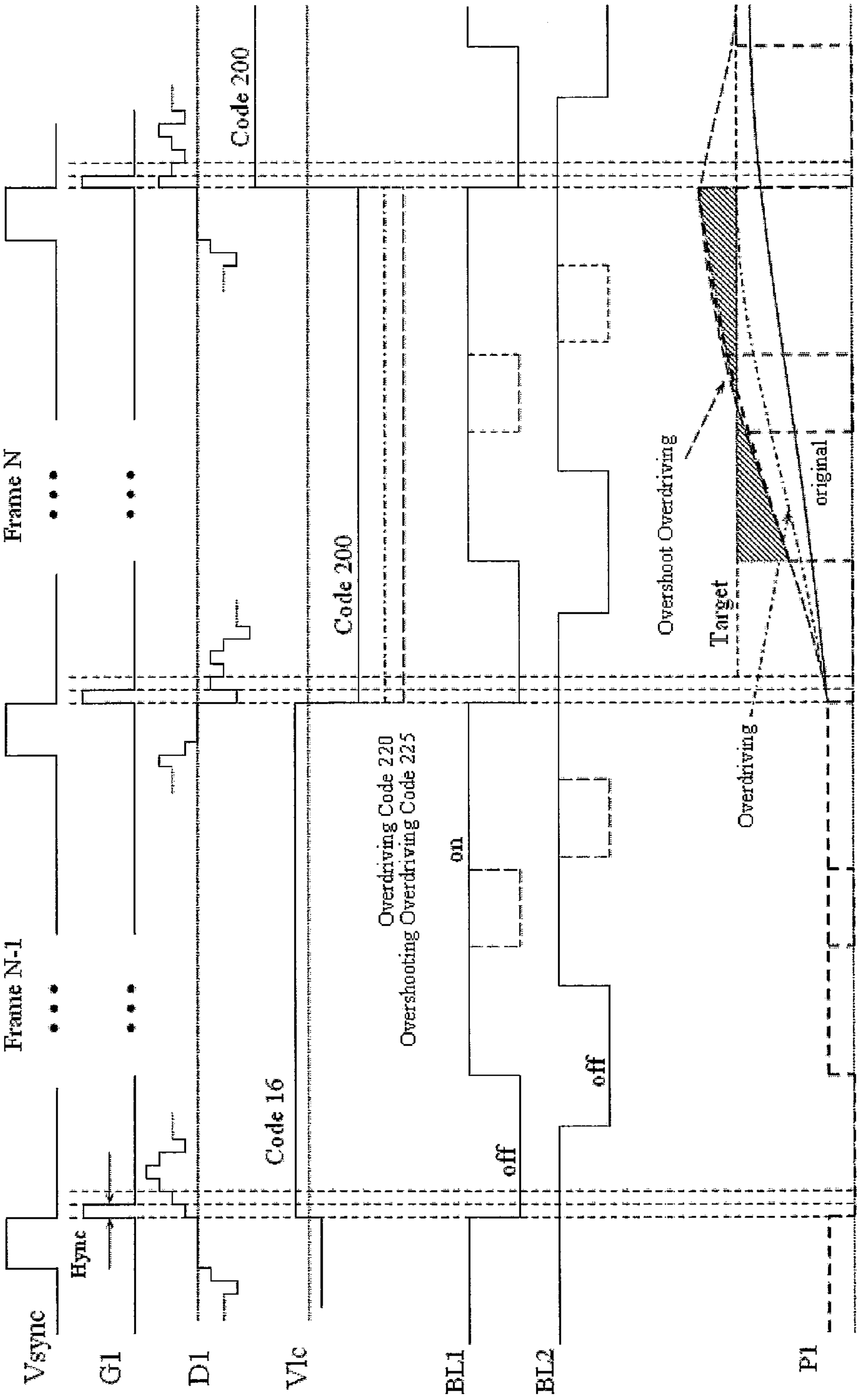
FIG. 4*a* is a waveform diagram showing the timing relationship of various control signals according to a second embodiment of the present invention.

FIG. 4*a* is a waveform diagram showing the timing relationship of various control signals according to a second embodiment of the present invention. The present embodiment uses low-cost, frame-rate scanning but still can effectively eliminate residuals. As described earlier, if the overdriving voltage is not sufficient, some part of the transient period is still visible as the pixels fail to reach their target grey levels after the backlight is turned on. The present embodiment therefore applies an excessive overdriving voltage code225 and, by the trajectory of the variation of the pixel P1's grey level, the excessive overdriving voltage would cause the pixel P1's grey level to overshoot above its target grey level. Again, by turning off the backlight, some part of the transient period is not visible while the other part of the transient period where the grey level is approaching and shooting over the target grey level (i.e., the two shaded areas in the diagram) is still visible. However, due to the integration of the human's visual persistence, a viewer perceives the effect of the target grey level as the two shaded areas cancel each other. In other words, with the present embodiment, the integration of a pixel's grey level over time during the period where the backlight is turned on is zero or at least very close to zero. Similarly, the present invention can also apply control signals to the rows of LEDs with a frequency twice of the LCD device's frame rate (please note the dashed lines of the control signals BL1 and BL2).

Figure 4B:
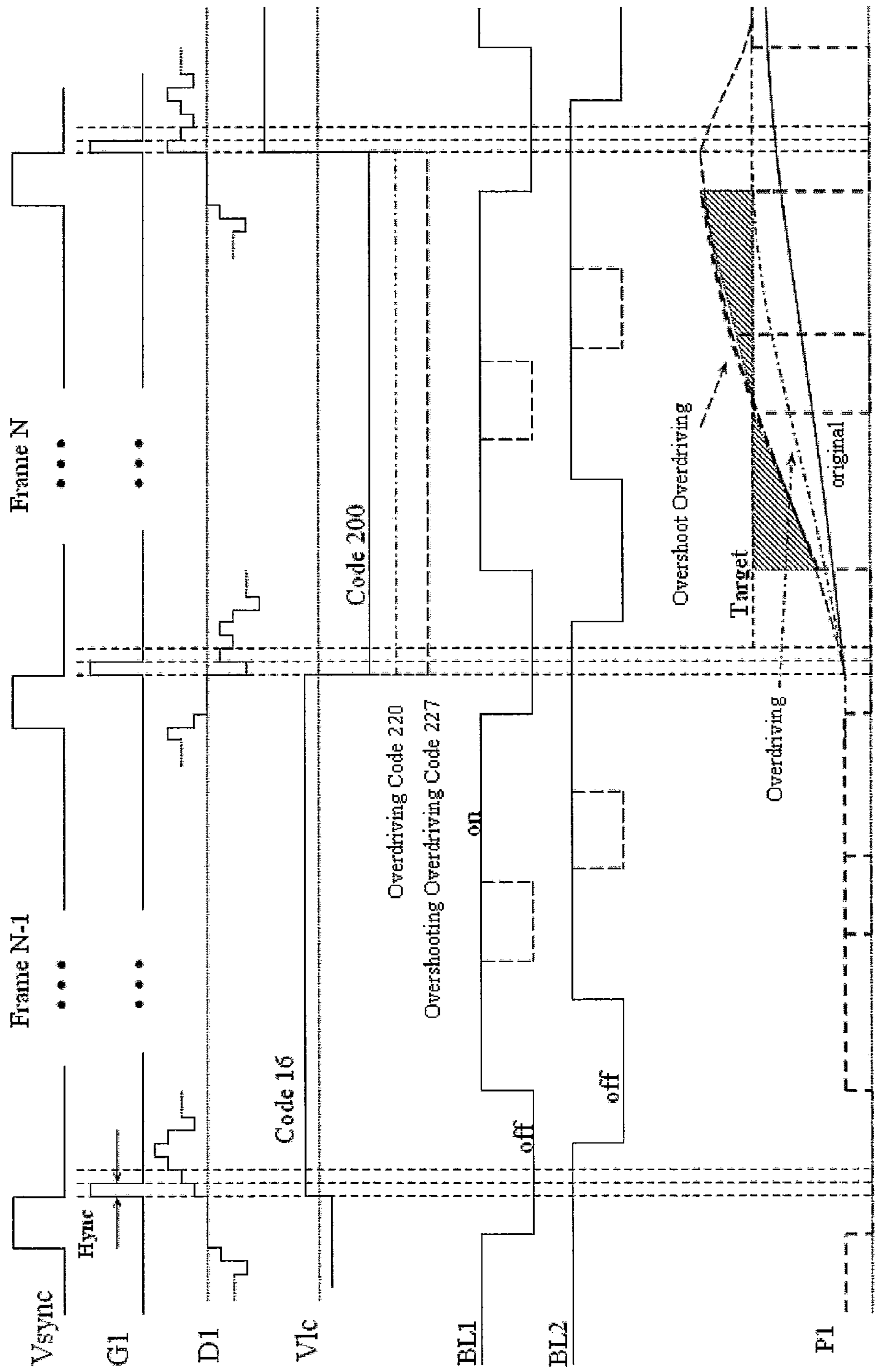
FIGS. 4*b* and 4*c* are waveform diagrams showing the timing relationship of various control signals according to two variations of the second embodiment of the present invention.
Figure 4C:
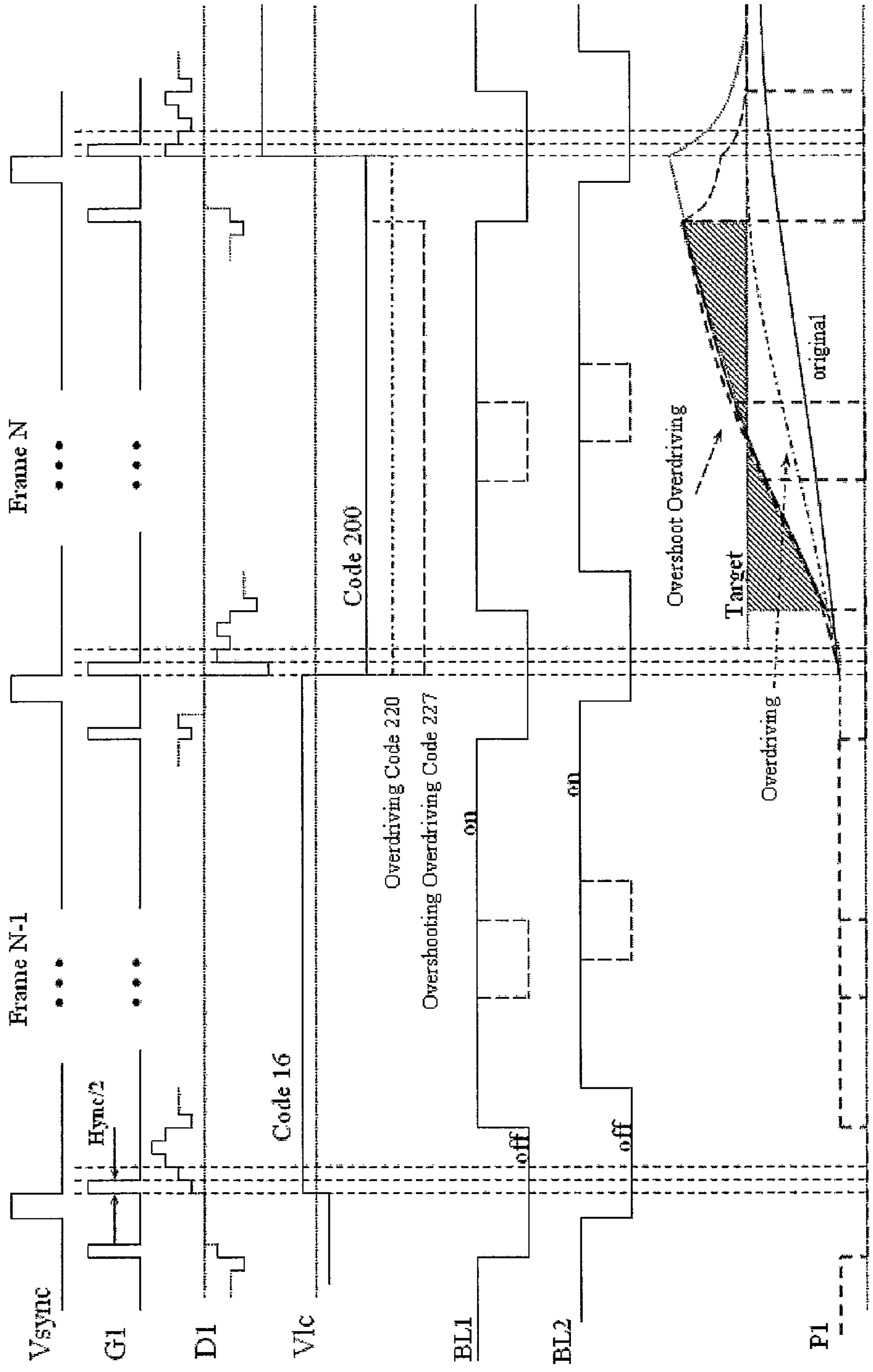

FIGS. 4*b* and 4*c* are waveform diagrams showing the timing relationship of various control signals according to two variations of the second embodiment of the present invention. As shown in FIG. 4*b*, an even larger excessive overdriving voltage code227 is applied. As can be imagined, the overshooting area (i.e., the shaded area above the target grey level) would be larger than the deficient area (i.e., the shaded area below the target grey level). However, the present embodiment turns off the backlight prematurely. In other words, the present embodiment decreases the period of time the backlight is turned on so as to cut short the overshooting area. As such, the deficient area and the short-cut overshooting area still cancel each other. The advantage of this embodiment is that, as larger driving voltage is applied, the pixel reaches its target grey level faster. Similarly, the present invention can also apply control signals to the rows of LEDs with a frequency twice of the LCD device's frame rate (please note the dashed line of the control signal BL1).

As shown in FIG. 4*c*, the larger excessive overdriving voltage code227 is applied and the backlight is turned off prematurely, just like the previous embodiment. However, during the period of time the backlight is off, it is pointless to continue to supply driving voltages to the pixels. Therefore, the present embodiment reduces the driving voltage to a smaller level (e.g., the target voltage) during the period when the backlight is turned off prematurely. The advantage of the embodiment is that lower power consumption can be achieved. Similarly, the present invention can also apply control signals to the rows of LEDs with a frequency twice of the LCD device's frame rate (please note the dashed line of the control signal BL1).

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for driving a display device having a direct-lit backlight module having a plurality of LEDs as light source arranged in a plurality of horizontal rows where said display has a panel positioned in front of said backlight module, said panel has a plurality of horizontal scan lines and a plurality of vertical data lines, the intersection of a said scan line and a said data line defines a pixel of said panel, said pixel is turned by enabling said scan line, supplying a driving voltage on said data line, and turning on a row of said LEDs behind said pixel, said pixel has a retardation property with which the grey level of said pixel gradually approaches the grey level corresponding to said driving voltage, said method comprising the steps of:

within an initial portion of the period of a frame, applying an overdriving voltage to said pixel that is larger than the voltage corresponding to a target grey level of said pixel within said period and then, with the remaining portion of said period, applying a driving voltage to said pixel that is equal to the voltage corresponding to said target grey level of said pixel; and within said period, applying a control signal whose frequency is at least equal to the frame rate of said display device so that, said row of said LEDs is turned off at a beginning period of each frame.

2. The method according to claim 1, wherein said display device is one of a LCD device, a plasma display device, and an OLED device.

3. The method according to claim 1, wherein the frequency of said control signal is twice of the frame rate of said display device.

* * * * *